United States Patent [19]

Moriwaki

[11] Patent Number: 4,748,628
[45] Date of Patent: May 31, 1988

[54] METHOD AND APPARATUS FOR CORRECTING ERRORS IN DIGITAL AUDIO SIGNALS

[75] Inventor: Hisayoshi Moriwaki, Kanagawa, Japan

[73] Assignee: Sony Corporation, Tokyo, Japan

[21] Appl. No.: 921,529

[22] Filed: Oct. 22, 1986

[30] Foreign Application Priority Data

Nov. 20, 1986 [JP] Japan ................. 61-P260666

[51] Int. Cl.⁴ .......................................... G06F 11/00
[52] U.S. Cl. .......................................... 371/40; 371/49
[58] Field of Search ............... 371/37, 38, 39, 40, 371/49, 50

[56] References Cited

U.S. PATENT DOCUMENTS

| | | | |
|---|---|---|---|
| 4,397,022 | 8/1983 | Weng | 371/37 |
| 4,437,185 | 3/1984 | Sako | 371/39 |
| 4,450,562 | 5/1984 | Wacyk | 371/49 |
| 4,541,093 | 9/1985 | Furuya | 371/40 |
| 4,562,578 | 12/1985 | Odaka | 371/39 |
| 4,593,394 | 6/1986 | Tomimitsu | 371/39 |
| 4,607,367 | 8/1986 | Ive | 371/38 |
| 4,649,540 | 3/1987 | Proebstring | 371/37 |
| 4,661,955 | 4/1987 | Arlington | 371/38 |

Primary Examiner—Michael R. Fleming
Attorney, Agent, or Firm—Alvin Sinderbrand

[57] ABSTRACT

In correcting errors in a received digital data signal having information data a pair of parity series P and Q determined by the information data and a CRC code determined by the information data and the parity series; a parity check operation is performed for checking errors in either the parity series P or Q of the received digital data signal, error correcting operation is performed for correcting erroneous data of either the P series or the Q series data on the basis of an error pointer generated by the CRC code included in the received digital data signal, and a sequence of the parity check and error correcting operations is established for interposing at least one parity check operation among a series of error correcting operations.

5 Claims, 9 Drawing Sheets

FIG.9A

| j<br>i | 1 | 2 | 3 | 4 | 5 | 6 | 7 | 8 | 9 | --- |
|---|---|---|---|---|---|---|---|---|---|---|
| 1 | ○ | ○ | ○ | ○ | ● | ○ | ○ | ○ | ○ | --- |
| 2 | ○ | ○ | ○ | ○ | ● | ○ | ○ | ○ | ○ | --- |
| 3 | ○ | ○ | ○ | ○ | ● | ○ | ⊗ | ○ | ○ | --- |

FIG.9B

| j<br>i | 1 | 2 | 3 | 4 | 5 | 6 | 7 | 8 | 9 | --- |
|---|---|---|---|---|---|---|---|---|---|---|
| 1 | ○ | ○ | ● | ○ | ○ | ○ | ○ | ○ | ○ | --- |
| 2 | ○ | ○ | ○ | ○ | ● | ○ | ○ | ○ | ○ | --- |
| 3 | ○ | ○ | ○ | ○ | ○ | ○ | ● | ○ | ○ | --- |

METHOD AND APPARATUS FOR CORRECTING ERRORS IN DIGITAL AUDIO SIGNALS

BACKGROUND OF THE INVENTION

1. Field of the Invention

The present invention relates generally to digital data transmission and, more specifically, is directed to the correction of errors in digital audio signals.

2. Description of the Prior Art

It is known to use a cross-interleave technique for transforming a digital data signal into an error correctable code structure. A known construction suitable to perform such cross-interleave error correction is shown in FIG. 1 in which each of $W_0, W_1, W_2$ and $W_3$ represents an audio data series. When four words contained in the respective audio data series are applied to modulo 2 adders, each represented schematically in FIG. 1 by an open circle, a first parity data series P is generated. This data series P is fed to several delay circuits, each of which provides a different time delay represented by $d, 2d, 3d, 4d$ and $5d$, where d represents one unit of delay time. The result of applying the first parity data series P to the several delay circuits providing different amounts of time delay is to rearrange the data series $W_0$ to $W_3$ from the first arrangement state into a second arrangement state. The five words derived from the data series in this second arrangement state are then added, in a second set of modulo 2 adders each indicated schematically in FIG. 1 by an open circle, thereby generating a second parity data series Q.

Because such cross-interleave technique has the feature that each word of a digital audio signal is contained in two parity data series P and Q, this technique has high error correcting capabilities. Nevertheless, in using this cross-interleave error correction coding method, when there are four erroneous words in one block, the probability that error correction is impossible must be considered. For example, in using a cross-interleave technique where four words of digital data are added with two parity words, a parity series formed thereby can be represented as in FIG. 2, in which each solid circle schematically represents one word of a code symbol. In FIG. 2, five words in the vertical direction represent a parity series P, and six words in the diagonal direction represent a parity series Q. Specific words symbolized by $S_0$ through $S_5$ are represented schematically by open circles having solid circular centers.

Assuming that the data transmission is random, and further assuming that, in a decoder, P-decoding and Q-decoding will be accomplished by using the parity P and the parity Q, respectively, and that such P- and Q-decoding will be alternately repeated a number of times, the extent to which error correction for each of the specific words $S_0$ to $S_5$ is impossible may be seen. For example, in the case of the word represented by symbol $S_0$, when four symbols including the symbol $S_0$ are arranged in a trapezoidal relationship on the data field, as represented in FIG. 2, and contain errors at the same time, two error words will be contained in the P- and Q-parity series, respectively, and, hence, such errors cannot be corrected. If the number of such trapezoidal patterns is counted, the probability that the error correction will not be possible can be determined. In regard to the words represented by the other symbols $S_1$ to $S_5$, when four words including these symbols are arranged to form a parallelogram and are simultaneously erroneous, the error correction is again seen to be impossible when using the cross-interleave technique.

If the probability that one word is erroneous is taken as $P_s$, then the probability that the error correction will be impossible at each word represented by the symbols $S_0$ to $S_5$ is given as follows:

$P_0 = 10 \, P_s^4$
$P_1 = 10 \, P_s^4$
$P_2 = 13 \, P_s^4$
$P_3 = 14 \, P_s^4$
$P_4 = 13 \, P_s^4$
$P_5 = 10 \, P_s^4$

Of course, the case where more than five words are simultaneously erroneous can occur and, in that case, the error correction will also be impossible. However, the probability in such situation, which is less than $P_s^5$, is neglected. Not being limited to four words, generally in the case of n words-two parity, a similar tendency is apparent.

In such known error correcting coding method, the probability that error correction is impossible is dependent upon the data channel under consideration so that parity data is allocated to the position of $S_0, S_1$ or $S_5$ where such probability is shown to be relatively low. Nevertheless, since information data is much more important than parity data used for error correction, it is desirable that information data, which may be pulse code modulation (PCM) data in the case of audio signals, be located at a position where the probability that the error correction is impossible becomes quite low, that is, it should be at a location where it can be assumed that most errors can be corrected.

FIG. 3 shows a relationship among various data points, and in which audio data series $W_0$ and $W_1$ are located at positions corresponding to symbols $S_0$ and $S_1$, respectively; parity data series Q and P are located at positions corresponding to symbols $S_2$ and $S_3$, respectively; and audio data series $W_2$ and $W_3$ are located at positions corresponding to symbols $S_4$ and $S_5$, respectively. In FIG. 3, five words represented by solid circles generate a parity word P, while six words represented by open circles generate a parity word Q. As may be seen in FIG. 3, in the series generating the parity word P, there is a blank appearing at the location corresponding to the parity word Q, and this blank poses a problem in the case of a complete cross-interleave error correcting technique.

In such complete cross-interleave technique, interleaving is completed with a unit formed of a predetermined number of words of PCM data. FIG. 4 illustrates a situation similar to that described above in which there are four symbols and two parity words, and data is written in a memory having a matrix structure of four symbols by m blocks. As shown in FIG. 4, four words represented by solid circles are read out to form a parity word P, which is written in the memory, and then five words represented by open circles are read out to form a parity word Q. The generation of the parity word P is completed in a matrix of four symbols by m blocks, and the generation of the parity word Q is completed in a matrix of five symbols by m blocks. A synchronizing signal, a block address signal, and a cyclic redundancy check (CRC) code for error detection are added to every block and then recorded.

In this kind of complete cross-interleave error correction, it is desirable that a large distance D (or number of blocks) exist between two words contained in a series for generating a parity symbol P, because the length of a burst error that is correctable by the parity symbol P is defined by this distance D (or number of blocks). Furthermore, it is necessary that the number of remaining blocks, represented by the distance D' in FIG. 4, be less than the number of blocks represented by the distance D. The distance D is the distance or number of blocks between the two closest words which are contained in the series for generating the parity P. As will be clear from FIG. 4, if the parity symbol Q is positioned at the center of one block, the distance between words $W_1$ and P becomes 2D thereby presenting a problem in that the distance D or number of blocks between two symbols cannot be increased.

In view of the foregoing problem, a complete cross-interleave system has been proposed, for example, as described in detail in U.S. Pat. No. 4,562,578 having the same Assignee as this application, and in which one parity symbol P is positioned at the center of a block, where the probability is high that, if an error occurs there, it will be impossible to correct, while the other parity symbol Q is positioned at the end of the block in order to lengthen the block and thereby to maximize the burst error length that can be corrected.

The system disclosed in U.S. Pat. No. 4,562,578 is applied to a situation in which a stereophonic audio signal, related to a video signal of an NTSC system, is digitized and recorded on a magnetic tape by a rotary head in a manner now generally well-known.

FIG. 5 shows the arrangement of one data unit in which one word consists of eight bits, specifically, $n=8$ words, $m=132$ blocks, and $n \times m = 1056$ words. The digital audio signal of one field in the NTSC system is 1050 words, so that, when the sampling frequency is $2F_h$ (where $F_h$ is the horizontal frequency), six words of control data ($ID_0, \ldots ID_5$) must be added to the words in the field, preferably at the beginning thereof. In other words, six words of control data are added to the digital audio signal in one field, which is sequential as follows: $L_0, R_0, L_1, R_1, R_2, \ldots L_{522}, L_{523}$ and $R_{523}$.

In such control data, $ID_0$ is a marker word and $ID_1$ to $ID_4$ are time codes, in which $ID_1$ represents hours, $ID_2$ represents minutes, $ID_3$ represents seconds, and $ID_4$ represents fields. Word $ID_5$ includes eight bits $a_0$ to $a_7$, which comprise the following information: bit $a_0$ represents whether the control data is effective; bits $a_1$ and $a_2$ represent the specific kind of digital audio signal (monaural, stereo, bilingual, etc.); bit $a_3$ discriminates between audio information and information for some other display and relates to one channel; bit $a_4$ provides similar discrimination in relation to the other channel; bits $a_5$ and $a_6$ represent start and stop information and these bits are set to a high level at the start and stop of the recording; and bit $a_7$ represents information related to avoiding damping.

The 1056 words that include the control data $ID_0$ to $ID_5$ are arranged so that they have a distance of 44 blocks in the lateral direction at every two words, that is, two-by-two, such as, $ID_0$–$ID_1$, $ID_2$–$ID_3$, $ID_4$–$ID_5$, and so on. In a hardware implementation, this may be achieved by writing at addresses separated by 44 blocks, as controlled by the address control of a random access memory (RAM). If the control data or parity data are separated, then two words Li and Ri are arranged in the lateral direction or left to right direction in relation to FIG. 5. The reason the digital audio signal is interleaved by being divided into three in the lateral direction is that the correctable burst error length is thereby maximized, when using, for example, a mean-value interpolation.

More particularly, by such alteral arrangement of Li and Ri, the correctable length can be made longer as compared with the case where they are arranged in the longitudinal direction or the up and down direction in FIG. 5.

Two parities, either odd or even, are added to the digital audio signal of one field that includes the control data. Referring now to FIG. 6, if the audio data series in each row of the above matrix structure is taken as $W_0, W_1, \ldots W_7$, a first parity series P having eight words in each data series is formed with a distance between such words of 14 blocks or 15 blocks in the lateral direction, and the words contained in this parity series P are symbolized by solid circles on FIG. 6.

If it were possible, all distances between two adjacent symbols of the first parity series P would be selected as fourteen blocks. However, since the distance D' at one portion may be as long as twenty blocks, then six blocks must be taken therefrom and used to form a distance of fifteen blocks between adjacent symbols at six different positions, thereby further enhancing the burst error correcting capability. Moreover, nine words, each of which is taken from the audio data series $W_0$ to $W_7$ and the parity series P, form a second parity series Q with a distance of twelve blocks between adjacent symbols, and the words contained in the series Q are symbolized by open circles in FIG. 6. The distance, in numbers of blocks, between the elements of the two parity series is chosen to be divisible by two or three. The first parity series P is positioned at the center of one block, while the second parity series Q is positioned at the end of the block. In other words, as described hereinabove, since the probability is high that errors occurring in data at the center of the block will be impossible to correct, U.S. Pat. No. 4,562,578 teaches to locate the parity series P at the center of the block, since it is less important than audio data, and further teaches to locate the parity series Q at the end of the block in order to maximize the distance between successive words that form the parity series P.

Each of the 132 blocks includes eight words of digital audio signal data, two words of parity data, and a cyclic redundancy check (CRC) code for error detection which may involve 16 bits added to the data of each block. A block synchronizing signal and a block address signal are also added to the group of blocks before it is recorded on a magnetic tape. If data of the first block is taken out of context and examined separately, it will appear as shown in FIG. 7, it being understood that after this block there will follow the second block, the third block, ... up to the 132d 132D block, moving left to right in FIG. 5.

A digital data transmission system of the type disclosed in U.S. Pat. No. 4,562,578 is shown in FIG. 8, in which solid line arrows show the direction of signal flow during transmitting or recording, and broken line arrows show the direction of signal flow during receiving, playback or reproduction. More particularly, in the recording or transmitting mode of the system shown on FIG. 8, an audio signal to be recorded or transmitted is supplied through an input terminal 1 to an analog-to-digital converter (A/D)2, and the resulting digitized audio signal is written into either a random access memory (RAM) 3 or a random access memory (RAM) 4. Each of the random access memories 3 and 4 has sufficient capacity to contain the entire digital audio signal comprising one field. During the time that the audio input data is being written into one or the other of random access memories 3 and 4, the data of the previous field is being read out from the other random access memory 4 or 3, and is fed to a P,Q encoder/decoder 6, which generates two parities to be written back into the other RAM. The data are written into predetermined areas of RAMs 3 and 4, respectively, as shown in FIGS. 5 and 6, and, in order to read out this data in an interleaved state, an address generator 5 is provided to generate a predetermined block address, for example, by means of an address counter, a read only memory and an adder (not shown).

The digital audio signal and parity data that have been read out from either the RAM 3 or 4 are fed to an adder 7, where they are added with a block address produced by a block address generator 8. The combined output signals from adder 7 are fed to a parallel-to-serial converter 9, with the resultant serialized signal being fed to a CRC encoder/decoder 10. In this example, the CRC encoder/decoder 10 has a generation polynomial given by $x^{16}+x^{12}+x^5+1$ and generates a CRC code (CRCC) of 16 bits that is added to each block. The operation of CRC encoder/decoder 10 is controlled by timing signals from a CRC timing generator 11. Since frequency modulation (FM) is employed in the signals of this example, the output signal from CRC encoder/decoder 10 is fed to an FM encoder/decoder 12, and the output signal from FM encoder/decoder 12 is fed to an adder 13, in which it is added with a block synchronizing signal produced by a synchronizing signal generator 14. The combined signal from adder 13 is fed to a output terminal 15 from which it is recorded on a magnetic tape using a known rotary magnetic head recording apparatus or otherwise transmitted.

In the receiving or reproducing mode of the system shown on FIG. 8, a digital signal reproduced from a magnetic tape (not shown) is fed through an input terminal 16 to a synchronous detecting circuit 17, and the resulting detected signal is fed to FM encoder/decoder 12 where the signal is FM demodulated. The FM demodulated signal is fed to CRC encoder/decoder 10 where it is error checked by a CRC code at every block, with the result of this error checking being a one bit error pointer, which is memorized in pointer random access memories (RAMs) 18 and 19. The pointer RAMs 18 and 19 correspond to RAMs 3 and 4 and each error pointer is written at the respective address of their 1320 blocks ($10 \times 132 = 1320$), and the block addresses common to RAMs 3 and 4 are also supplied to the pointer RAMs 18 and 9 from address generating circuit 5.

The reproduced and demodulated data signal is also supplied to a buffer 20 whose buffered output signal is fed to serial-to-parallel converter 21, which provides parallel-arranged data in a proper form for writing into RAMs 3 and 4. Buffer 20 functions to delay the reproduced data until an error pointer, which is the result of the CRC error check conducted by the CRC encoder/decoder 10, has been generated. In this reproducing mode, RAMs 3 and 4 operate in a fashion similar to that described above for the recording mode, so that, when one RAM 3 or 4 has one field of reproduced data being written therein, errors in reproduced data read out from the other RAM 4 or 3 are corrected. Upon writing reproduced data in either the RAM 3 or 4, an error word indicated by an error pointer is not written. To accomplish this, each error pointer read out from pointer RAM 18 or 19 is fed to a RAM timing generator 22, which generates control signals fed to RAMs 3 and 4 to prevent the writing of error words therein.

The reproduced data read out from RAMs 3 or 4 is supplied to P,Q encoder/decoder 6 to carry out error correction using known parity techniques and, once any errors in the data have been corrected, the data is again written back into RAM 3 or 4. In the case of such error correction, all that is required is that an error word have sufficient information to show that the word is erroneous and, as described above, the erroneous word itself is not written into RAM 3 or 4. If more than two error words are contained in one parity generating series, then error correction is impossible. However, when error correction using parity series P and error correction using parity series Q are alternately and repetitively carried out, the number of words for which error correction is impossible is reduced substantially.

The reproduced data read out from RAM 3 or 4 after errors have been corrected is supplied to an amending or interpolating circuit 23 that perform a mean-value-interpolating process on words having errors that cannot be corrected. The output of amending circuit 23 is fed to a digital-to-analog converter 24, and the analog output signal therefrom is fed through an output terminal 25 as a reproduced audio signal.

In the above-described error correction system, an error pointer is established for a data block including erroneous data on the basis of the corresponding CRC code. The error detection capability with CRC code is almost perfect in relation to, for example, a burst error of less than 16 bits, or a random error of less than 3 bits. However, there is a possibility of misdetection of errors which extend over numbers of bits greater than the above-mentioned magnitudes. For example, no error pointer may be established as to a data block including a burst error of more than 16 bits or a random error of more than 3 bits. If such misdetection is not compensated, scratch noises may arise in the reproduced audio. In addition, if correction is carried out on the basis of such misdetection, it results in miscorrection so that the error is further expanded.

It might be assumed that the above problem could be solved by using the Q parity series or P parity series to effect a parity check before effecting error correction. However, in such a parity check, when there is no error in a parity series, it is checked whether or not the syndrome of the parity series becomes zero. Therefore, if an error pointer is correctly established as to a parity series and the latter includes another error for which no error pointer is established, a parity check to the latter error is impossible. In that case, the erroneous data for which no error pointer is established cannot be corrected and remains erroneous.

OBJECTS AND SUMMARY OF THE INVENTION

Accordingly, it is an object of the present invention to provide an apparatus or method for correcting errors in a received digital data signal, and in which failures to correct erroneous data are reduced as much as possible.

In accordance with an aspect of the invention, an apparatus for correcting errors in a received digital data signal having a pair of parity series P and Q, and including a CRC code, comprises parity check means for checking errors in either the parity series P or the parity series Q of the received digital data signals, error correcting means for correcting erroneous data of either the P series data or the Q series data based on an error pointer generated by the CRC code included in the received digital data signal, and sequence control means coupled to the parity check means and the error correcting means for interposing at least one parity check operation by the parity check means among a series of plural error correcting operations by the error correcting means.

In accordance with another aspect of this invention, in a method of correcting errors in a received digital data signal having a pair of parity series P and Q and a CRC code; at least one step of checking for errors in either the parity series P or the parity series Q is interposed among a plurality of steps of correcting erroneous data of the P series data or the Q series data on the basis of an error pointer generated by the CRC code.

The above, and other objects, features and advantages of this invention will become apparent from the following detailed description of illustrative embodiments which is to be read in connection with the accompanying drawings in which corresponding parts or components appearing in several views are identified by the same reference numerals.

BRIEF DESCRIPTION OF THE DRAWINGS

FIGS. 9A and 9B are diagrams showing data arrangements, and to which reference will be made in explaining the present invention;

DETAILED DESCRIPTION OF PREFERRED EMBODIMENTS

Figure 1:
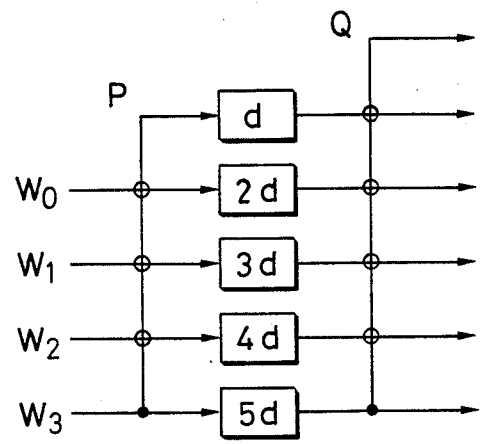
FIG. 1 is a block diagram showing a coding circuit according to the prior art for effecting error correction by means of a cross-interleave technique.
Figure 2:
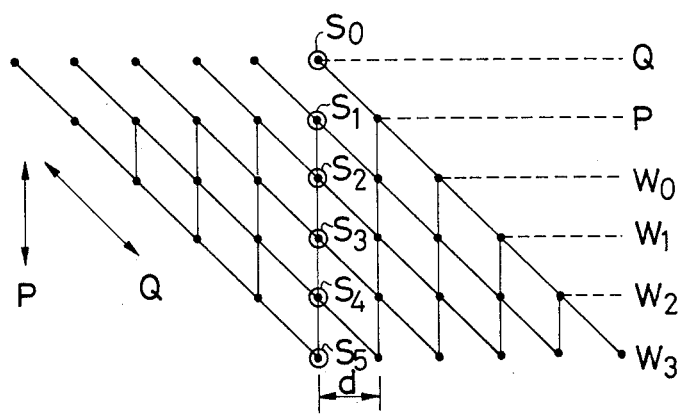
FIGS. 2, 3 and 4 are diagrams to which reference will be made in explaining error correction processes according to the prior art.
Figure 3:
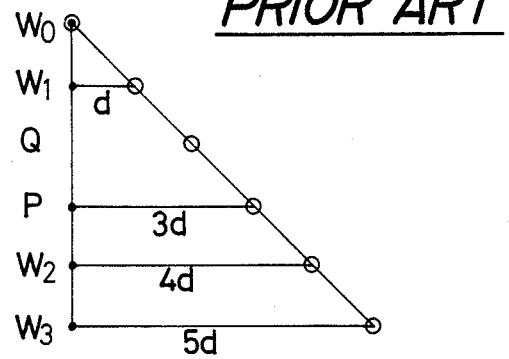
Figure 4:
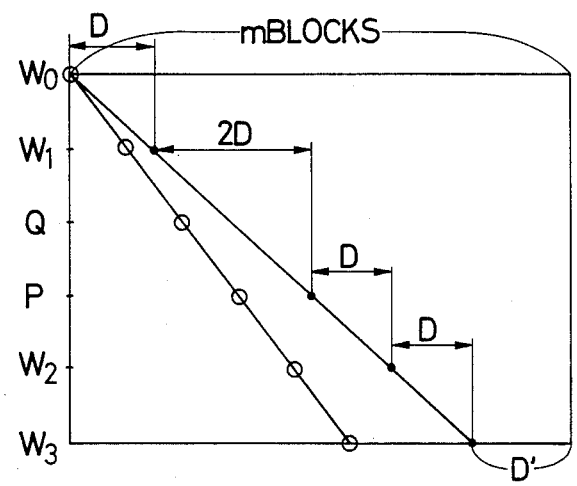
Figure 5:
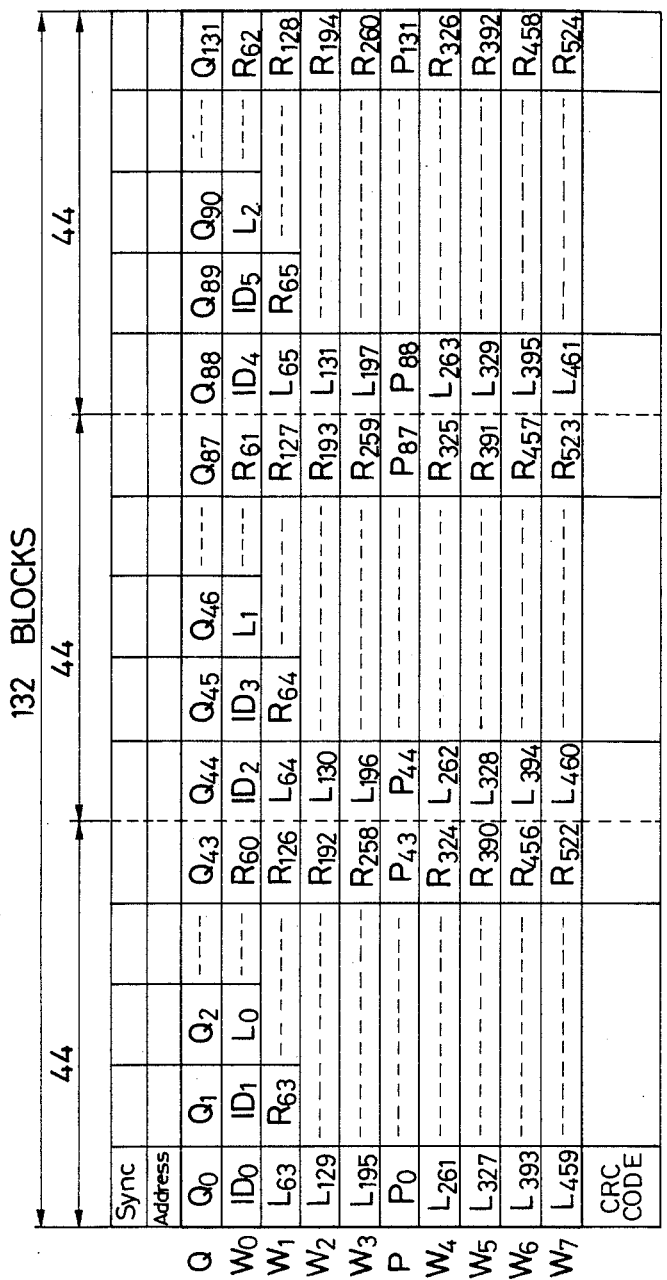
FIGS. 5, 6 and 7 are diagrams to which reference will be made in explaining data structures used in the prior art.
Figures 6, 7:
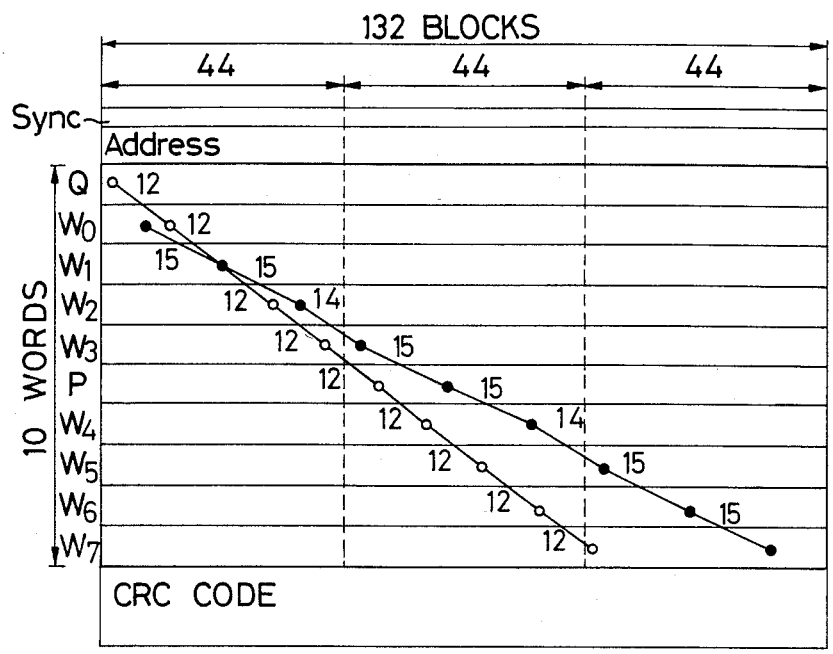
Figure 8:
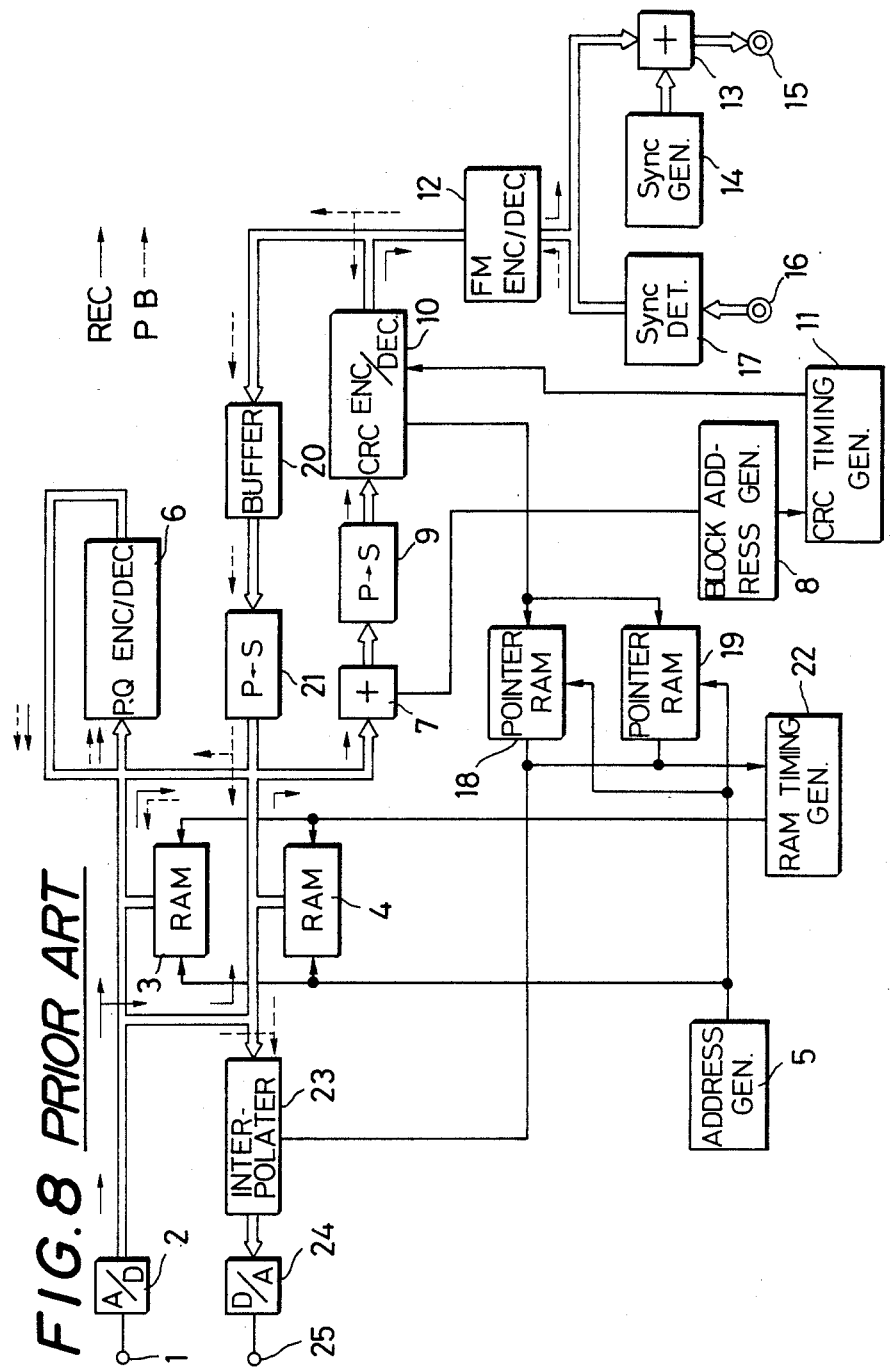
FIG. 8 is a block diagram showing an error correction circuit according to the prior art.

Referring first to FIGS. 9A and 9B, in which each data is represented by $w_{ij}$, it will be seen that a pair of parity series P and Q may be selected as follows:

P: $w_{1j}$, $w_{2(j+3)}$, $w_{3(j+6)}$ (for example, $w_{11}, w_{24}, w_{37}$)

Q: $w_{1j}$, $w_{2(j+2)}$, $w_{3(j+4)}$ (for example, $w_{11}, w_{23}, w_{35}$)

A white or open circle represents correct data and a black or solid circle represents erroneous data which has been detected with CRC code so that an error pointer is established therefor. On FIG. 9A, ⊗ represents hidden erroneous data ($w_{37}$), that is, erroneous data which has not been detected with CRC code so that no error pointer is established therefor.

Generally, in accordance with the present invention, an error correction method comprises a sequence of steps in the following order, a Q parity check→a P correction→a Q parity check→a P correction→a Q correction -----, that is, at least one step of checking for errors in the parity series P or Q is interposed in a series of steps of correcting erroneous data of the P series data or the Q series data on the basis of an error pointer generated by the CRC code.

In the first step above (Q parity check mode)

The hidden erroneous data ($w_{37}$) is from a Q parity series of $w_{13}, w_{25}$ and $w_{37}$. Since an error pointer has been established as to $w_{25}$, the parity check in relation to $w_{37}$ is impossible. Therefore, in this first step for checking errors in the Q parity series, it cannot be detected that the data $w_{37}$ is erroneous.

The second step (P correction mode)

Assuming that an error pointer has been established only as to the erroneous data existing in the fifth column on FIG. 9A, then all of the data $w_{15}, w_{25}$ and $w_{35}$ in the fifth column are corrected by an error correction with the P parity series and the error pointer is cleared. By this step, there is no erroneous data remaining in the fifth column, that is, all of the erroneous data is corrected with the exception of the hidden erroneous data $w_{37}$.

The third step (Q parity check mode)

At the beginning of this step, since the error pointer has been cleared, all data except $w_{37}$ ought to be represented by white or open circles in FIG. 9A. Accordingly, the Q parity check is effected in respect to every Q parity series and, as a result of the Q parity check, it is found that the syndrome (Exclusive OR) of a Q parity series of $w_{13}, w_{25}$ and $w_{37}$ is not zero. Namely, $$w_{13} \oplus w_{25} \oplus w_{37} \neq 0$$

In other words, it is found that there is hidden erroneous data in this series. Thereupon, assuming that all of the data $w_{13}, w_{25}$ and $w_{37}$ in this series are erroneous, an error pointer is established as in FIG. 9B.

The fourth step (P correction mode)

All of the data $w_{l3}, w_{25}$ and $w_{37}$ for which an error pointer has been established can be corrected with the P parity series. Accordingly, at the completion of this step, all errors of data are corrected.

In the above-described method, the Q parity series are used for the parity checking. However, the P parity series may be used alternatively for the parity checking. Further, in the above described method, a P correction is carried out between the first and second parity checks using the Q parity series. However, the second parity check may be carried out after several repetitions of the P corrections and Q corrections in dependence on the degree or extent of the errors. Furthermore, the parity checks may be carried out three or more times.

Figure 10:
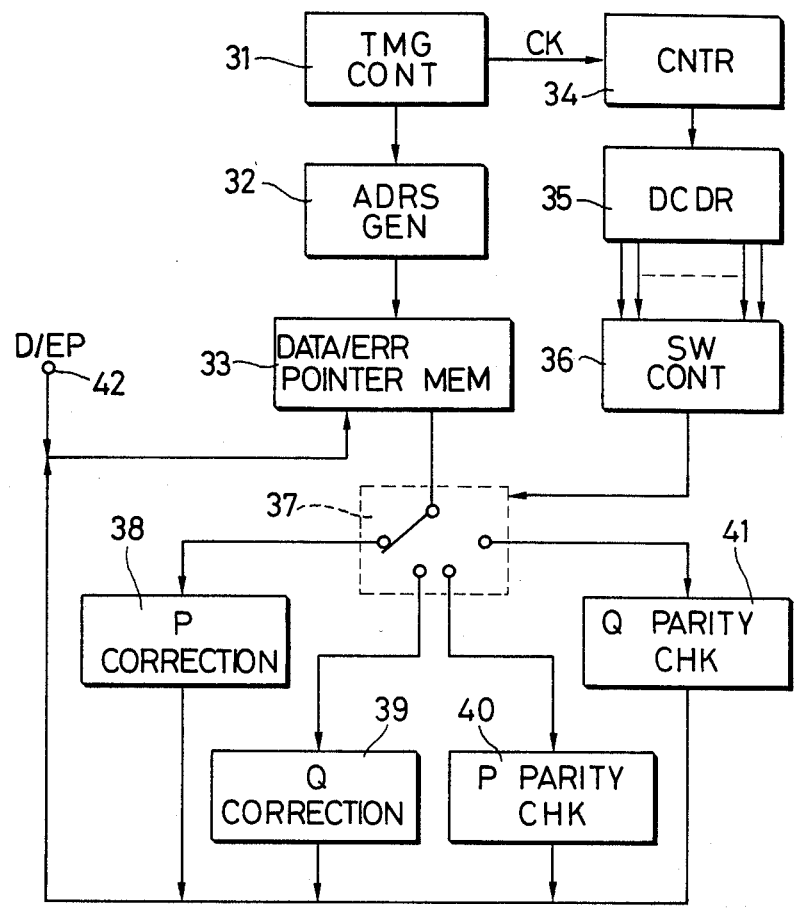
FIG. 10 is a block diagram showing an error correction circuit according to an embodiment of the invention.

FIG. 10 shows a circuit configuration for carrying out the above-described correcting method according to an embodiment of the invention, and in which a control circuit 31 is provided for controlling the timing of the whole process. An address generating circuit 32 is operative under the control of circuit 31 for generating an address signal corresponding to each parity series and which addresses a memory 33 in which data and error pointers are written. A counter 34 is provided for counting clocks CK from control circuit 31 whenever each of the above-described parity check operations and correction operations is completed. A decoder 35 decodes the counting values of counter 34, and the decoded output is applied to a switch control circuit 36 which suitably selects a respective mode or position of a switch 37. Switch 37 is shown to have four positions in which the output of memory 33 is connected to a P-correcting circuit 38, a Q-correcting circuit 39, a P-parity check circuit 40 and a Q-parity check circuit 41, respectively. The outputs of circuits 38–41 are connected back to the input of memory 33. An input terminal 42 receives data and error pointers (D/EP). Data from the input terminal 42 and from circuits 38 to 41 are written into and then read out from the memory 33 on the basis of address signals generated in address generating circuit 32.

Figure 11:
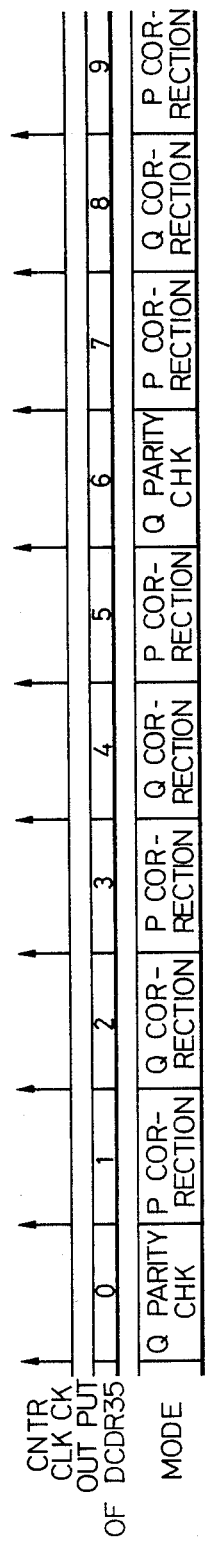
FIG. 11 is a timing chart to which reference will be made in explaining the operation of the circuit of FIG. 10.

FIG. 11 shows a timing chart for the circuit of FIG. 10, in which Q parity checks are carried out at the first step and the seventh step and therebetween P corrections and Q corrections are alternately carried out. It will be appreciated that counter 34, in counting successive clocks CK from control circuit 31, provides counted values which, when decoded in decoder 35, causes circuit 36 to control switch 37 for effecting successive connections to circuits 38–41 in the order shown on FIG. 11.

In the above-described embodiment of the invention, the number of alternating P-correction and Q-correction steps occurring between the first Q-parity check and the second Q-parity check is fixed. However, even when, as in the embodiment of FIGS. 10 and 11, the P- and Q-corrections are repeated a certain number of times, if the error rate is very bad, numerous error pointers will still remain so that sufficient correction cannot be expected even at the second parity check. For this reason, the second or later parity check is desirably carried out only after the number of remaining error pointers is made smaller than a predetermined value.

Figure 12:
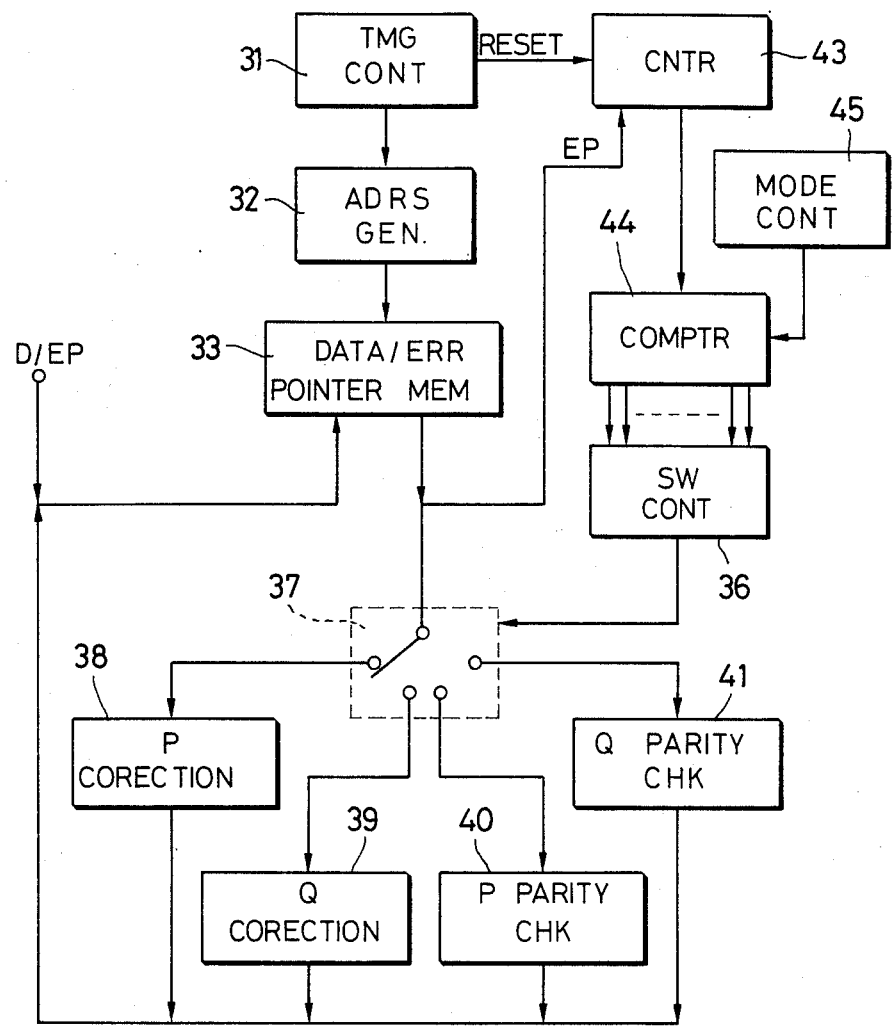
FIG. 12 is a block diagram showing an error correction circuit according to another embodiment of the invention.

FIG. 12 shows a circuit configuration according to another embodiment of the invention, in which the second and later parity checks are carried out after the number of remaining error pointers becomes smaller than a predetermined value. In FIG. 12, the parts which correspond to those described with reference to FIG. 10 are identified by the same reference numerals.

In the embodiment of FIG. 12, a counter 43 is provided for counting error pointers (EP) read out from memory 33. The counter 43 is reset at the beginning of each correction or parity check operation by the clock CK from control circuit 31. Switch control circuit 36 is controlled on the basis of a comparison by a comparator 44 between the counting value of counter 43 and a control signal from a mode control circuit 45. The times for carrying out parity checks are determined by such control signal from mode control circuit 45. In other words, switch control circuit 36 causes switch 37 to connect memory 33 to Q-parity check circuit 41 (or to P-parity check circuit 40) only when the output of comparator 44 indicates that the number of error pointers remaining, and hence counted by counter 43, has been reduced to the value determined by mode control circuit 45.

According to the invention, the number of erroneous data which are omitted due to misdetections with CRC code can be reduced more than by prior art methods. More particularly, the number of erroneous data which have been omitted in the first parity check can be decreased.

Although specific embodiments of the invention have been described in detail with reference to the accompanying drawings, it will be understood that the invention is not limited to those precise embodiments and that various changes and modifications can be effected therein by one skilled in the art without departing from the scope or spirit of the invention as defined in the appended claims.

What is claimed is:

1. An apparatus for correcting errors in a received digital data signal including information data, a first parity series based on said information data, a second parity series based on said information data and said first parity series, and a CRC code determined by said information data and said first and second parity series, comprising:
   parity check means for checking for errors in data of either said first parity series or said second parity series of said received digital data signal on the basis of error pointers generated by said CRC code included in the received digital data signal;
   error correcting means for correcting checked error in the data of either said first parity series or said second parity series data; and
   sequence control means coupled to said parity check means and said error correcting means for interposing at least one parity check operation by said parity check means in the midst of a plurality of error correcting operations by said error correcting means.

2. An apparatus according to claim 1; wherein said sequence control means causes a parity check operation by said parity check means at the beginning of each one of a number of series of error correcting operations by said error correcting means.

3. An apparatus according to claim 2; wherein said sequence control means includes counter means which counts the number of error pointers, and said at least one parity check operation interposed in the midst of error correcting operations is positioned among the latter on the basis of the number of said error pointers determined by said counter means.

4. An apparatus according to claim 1; wherein said sequence control means includes means providing a clock signal at the completion of each of said parity check and error correcting operations, counter means for counting said clock signal, a sequence switch means for selecting first and second parity check operations or error correcting operations in respect to said first and second parity series, and switch control means for controlling said sequence switch means in accordance with the value of said counter means.

5. An apparatus according to claim 1; wherein said sequence control means includes means providing a clock signal at the completion of each of said parity check and error correcting operations, counter means reset by said clock signal and being operative to count the error pointers in each interval between clock signals, switch means for selecting said first and second parity check and error correcting operations, means for comparing the count value of said counter means with a reference value and providing a compared output, and means for controlling said switch means to provide a sequence of said first and second parity check and error correcting operations in accordance with said compared output.

* * * * *